United States Patent
Abe

[11] Patent Number: 5,824,450
[45] Date of Patent: Oct. 20, 1998

[54] LIGHT IRRADIATION METHOD AND OPTICAL INFORMATION RECORDING METHOD

[75] Inventor: Michiharu Abe, Yokohama, Japan

[73] Assignee: Ricoh Company, Ltd., Tokyo, Japan

[21] Appl. No.: 597,567

[22] Filed: Feb. 2, 1996

Related U.S. Application Data

[63] Continuation of Ser. No. 458,858, Jun. 1, 1995, abandoned, which is a continuation of Ser. No. 915,950, Jul. 17, 1992, abandoned.

[30] Foreign Application Priority Data

Jul. 19, 1991 [JP] Japan .................................. 3-204782

[51] Int. Cl.$^6$ ........................................................ G11B 7/00
[52] U.S. Cl. .................... 430/269; 430/270.11; 430/945; 250/492.1
[58] Field of Search ................................ 430/495.1, 945, 430/333, 339, 269, 271.1, 270.11; 369/100, 107; 250/492.1

[56] References Cited

U.S. PATENT DOCUMENTS

| | | | |
|---|---|---|---|
| 4,515,877 | 5/1985 | Barzynski et al. | 430/5 |
| 4,777,111 | 10/1988 | Blumel et al. | 430/156 |
| 5,026,619 | 6/1991 | Trundle | 430/19 |
| 5,061,582 | 10/1991 | Brettle et al. | 430/19 |
| 5,153,873 | 10/1992 | Spruit et al. | 369/275.2 |
| 5,246,758 | 9/1993 | Matsui et al. | 428/64 |

FOREIGN PATENT DOCUMENTS 4-128834  4/1992  Japan .................................. 430/495

*Primary Examiner*—John A. McPherson
*Attorney, Agent, or Firm*—Cooper & Dunham LLP

[57] ABSTRACT

An irradiation method of applying a light spot or a light pattern to an object with high resolution is performed by disposing, in close vicinity to the object, a light-absorbing contrast-increasing layer whose transmittance or reflectivity with respect to an incident light thereto increases as the intensity of the incident light or the exposure thereof to the incident light increases; and applying light to the object through the light-absorbing contrast-increasing layer. This method is applied to an optical information recording and reproducing method using an optical information recording medium including an optical information recording layer and an auxiliary layer whose transmittance or reflectance increases in a real time manner correspondingly to the energy of an incident light thereto.

2 Claims, 3 Drawing Sheets

LIGHT IRRADIATION METHOD AND OPTICAL INFORMATION RECORDING METHOD

This is a continuation of application Ser. No. 458,858, filed Jun. 1, 1995, now abandoned, which is a continuation of application Ser. No. 915,950, filed Jul. 17, 1992, now abandoned.

FIELD OF THE INVENTION

The present invention relates to a light irradiation method of applying light in the form of a light spot or light pattern to an object such as an optical information recording medium with high resolution, an optical information recording medium for recording information therein and reproducing recorded information therefrom by applying minute light spots, for instance, with a laser beam, an optical information recording method and a optical information reproducing method using the optical information recording medium

DISCUSSION OF BACKGROUND

A technique of recording information, reproducing recorded information, or modifying recorded information by applying a light spot or a light pattern to an object is applied in various fields, for instance, in the fields of optical information recording media such as optical discs, optical cards, and optical tapes, recording and reproducing apparatus using such optical information recording media, exposure apparatus for producing original discs for optical discs, exposure apparatus for producing LSI, photography, and printing. In particular, conventional optical information recording media and optical information recording and reproducing apparatus are described, for instance, in the following references:

(1) "Optical Disk Technology" (1989) by Morio Onoue, Noboru Murayama, Hiroshi Koide, Kazusa Yamada, and Makoto Kunikane, published by Radio Technology Publications Inc.

(2) "Organic Recording Materials for Optical Disk" (1989) edited by Organic Electronics Material Society, written by Michiharu Abe, and published by Bunshin Shuppan Co., Ltd.

(3) "Comprehensible Optical Disk" (1985) edited by Naoki Tsuda, and published by The Optronics Co, Ltd.

(4) "Comprehensible Optical Disk, second series" (1990) edited by Naoki Tsuda, and published by The Optronics Co, Ltd.

(5) "Short Wave Photoresist Materials" (1988) edited by Organic Electronics Material Society, written by Takumi Ueno and others, and published by Bunshin Shuppan Co., Ltd.

(6) Japanese Laid-open Patent Applications 3-97140 and 3-88156.

Each of the conventional optical information recording media and optical information recording and reproducing apparatus described in these references, however, has its own drawbacks. In particular, the light spot application methods described in the above references (1) to (4) are employed in the recording and reproduction of information in optical discs. In the light spot application methods, a light spot is directly applied to an optical disc, so that it is impossible to perform recording and reproduction of information with the application of a light spot smaller than the diffraction limit which is determined by the wavelength of a light beam and an optical system employed, and therefore the recording density cannot be improved.

The methods described in the above references (6) are methods by which information can be reproduced with a higher recording density than the diffraction limit of a light spot employed. However, these methods have the shortcomings that they can be applied only to a magneto-optical recording medium and cannot be applied to a recording system of a type in which information is recorded or reproduced by use of the changes in the reflectivities of optical recording media in general use, such as conventional optical discs.

The above reference (5) describes pattern exposure methods, which is employed for producing, for instance, LSI, more specifically a contact exposure method, a projection exposure method, a light beam exposure method and the like. These methods, however, have the shortcomings that an object such as a photoresist film cannot be exposed to an irradiation pattern with a higher resolution than that of the irradiation pattern, and the resolution of the exposure pattern is limited to the diffraction limit of an optical system employed.

It is therefore a first object of the present invention to provide a light radiation method capable of performing exposure and printing to an object, or recording information in the object and reproducing recorded information therefrom, with higher resolution, higher definition, and higher contrast than those of a light spot or light pattern to be applied.

A second object of the present invention is to provide an optical information recording medium capable of optically recording information therein and reproducing recording information therefrom, with a substantially higher resolution than the spot diameter of a laser beam applied, and with higher optical density than that attained by the conventional optical information recording media.

A third object of the present invention is to provide an optical information recording method capable of recording information in the above-mentioned optical information recording medium, with higher optical density than that attained by conventional optical information recording methods.

A fourth object of the present invention is to provide an optical information reproducing method capable of reproducing recorded information in the above-mentioned optical information recording medium, with higher optical density than that attained by conventional optical information reproducing methods.

The first object of the present invention is achieved by a light radiation method of applying light in the form of a light spot or light pattern to an object such as an optical information recording medium with high resolution, which comprises the steps of (a) disposing, in close vicinity to the object, a light-absorbing contrast-increasing layer whose transmittance or reflectivity with respect to an incident light thereto increases as the intensity of the incident light or the exposure thereof to the incident light increases, and (b) applying the light to the object through the light-absorbing contrast-increasing layer.

The second object of the present invention is achieved by an optical information recording medium which comprises an optical information recording layer and an auxiliary layer whose transmittance or reflectivity to an incident light thereto increases in a real-time manner in correspondece with the energy of the incident light, the auxiliary layer being disposed in close vicinity to the optical information recording layer, or by an optical information recording medium comprising a substrate with rows of concave or convex pits, and an auxiliary layer whose transmittance or reflectivity with respect to an incident light thereto increases in a real-time manner in correspondence with the energy of the incident light, the auxiliary layer being formed on the substrate.

The third object of the present invention is achieved by an optical information recording method comprising the step of applying a minute light spot to the above-mentioned optical information recording medium which comprises the optical information recording layer and the auxiliary layer, thereby forming an optical mark within a region substantially narrower than the spread region of the aforementioned minute light spot.

The fourth object of the present invention can be achieved by an optical information reproducing method of reproducing recorded information, comprising the step of applying a minute light spot to (a) the above-mentioned optical information recording medium which comprises the optical information recording layer and the auxiliary layer, or to (b) the optical information recording medium comprising a substrate with rows of concave or convex pits, and an auxiliary layer whose transmittance or reflectivity with resct to an incident light thereto increases in a real-time manner in correspondece with the energy of the incident light, the auxiliary layer being formed on the substrate, thereby detecting the light reflected or transmitted within a region substantially narrower than the spread region of the aforementioned minute light spot.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
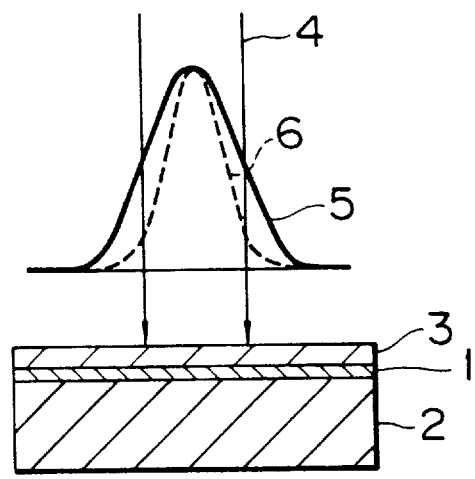
FIG. 1 is a diagram, in explanation of a light irradiation method according to the present invention.

The light irradiation method according to the present invention can be carried out by applying a light spot to an object as it is; by applying a light spot to an object in such a manner that the light spot is caused to scan the object as the light spot is moved relatively to the object; by applying a light spot with some modulation to an object in such a manner that the light spot is caused to scan the object as the light spot is moved relatively to the object; or by performing contact radiation or projection with a light pattern to the object.

This light irradiation method is capable of exposing the object to a light spot or light pattern with higher resolution, definition and contrast than those of the actually applied light spot or light pattern, whereby recording and reproduction with high density, and printing of fine optical patterns can be carried out. Thus, the light irradiation method according to the present invention can improve the recording density of an optical information recording medium and makes it possible to produce large scale highly integrated circuits (LSI).

The light irradiation method according to the present invention will now be explained with reference to FIG. 1. In the figure, reference numeral 1 indicates an object to be subjected to light irradiation, which is generally in the form of a thin film and may be provided on an appropriate substrate 2.

Examples of the object 1 for use in the present invention include heat-mode recording materials such as a thin metal or alloy film layer and a thin film layer comprising an organic dye; photon-mode recording materials such as photochromic materials and photoresist materials; photosensitive materials for photography, such as silver halide emulsion; diazonium photosensitive materials for photography; and photosensitive materials for electrophotography.

The object 1 is exposed to an irradiation light spot 4. For the convenience of explanation, the term "irradiation light spot" or "light spot" is employed here, but the light spot may be a light pattern in any shape, which consists of a plurality of light spots. The irradiation light spot 4 has a light intensity distribution 5 indicated by the solid line, so that it is extremely difficult to distribute the light intensity in a region narrower than a predetermined region by conventional methods because of the light diffraction phenomenon based on the wavelength of the lights which depends upon an optical system employed for the irradiation.

Under such circumstances, in the present invention, there is provided in close vicinity to the object a light-absorbing contrast-increasing layer 3 whose transmittance with respec to an applied irradiation light increases as the light intensity of the irradiation light or the exposure thereof to the irradiation light is increased, in such a configuration that the light spot is applied to the object 1 through the contrast-increasing layer 3.

Figure 2:
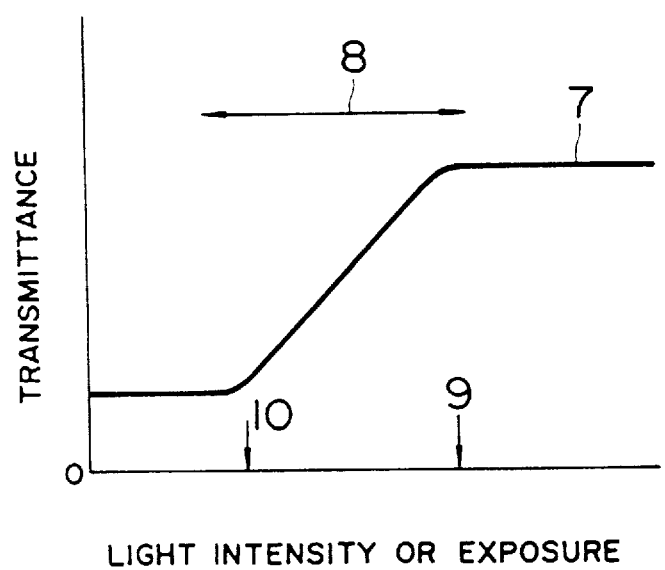
FIG. 2 is a graph showing the light intensity or exposure dependence of the transmittance of a contrast-increasing layer.

The contrast-increasing layer 3 for use in the present invention exhibits the light-intensity- or exposure-dependence 7 of the transmittance, and the transmittance increases in a specific range 8 as the light intensity or exposure is increased, as illustrated in FIG. 2.

When the original light spot has such an intensity distribution that the intensity at the central portion of the light spot is set at a level at position 9 in FIG. 2, while the intensity in the peripheral portion of the light spot is set at a level at position 10 in FIG. 2, the light with the intensity distribution 5 in the peripheral portion is substantially absorbed by the contrast-increasing layer 3, while only a little of the light with the intensity distribution 5 in the central portion is absorbed by the contrast-increasing layer 3, so that a light spot with an intensity distribution 6 indicated by the broken line reaches the object 1. Thus the object 1 is exposed to the light spot with the intensity distribution 6 which is narrower than that of the original light spot, whereby recording information and reproduction of recorded information can be carried out with higher resolution than that attained by the conventional methods.

The contrast-increasing layer 3 may be a layer whose transmittance or exposure properties corresponding to light intensity or exposure can be recovered or cannot be recovered when the light irradiation is terminated. However, a contrast-increasing layer whose transmittance or exposure properties are quickly recovered is preferable for use in practice, particularly when the contrast-increasing layer 3 is repeatedly used, or when the irradiation is carried out while the light spot is moved relative to the object 1, since higher improvement of the contrast can be attained.

The materials for the contrast-increasing layer 3 will now be specifically explained.

Examples of the materials for the contrast-increasing layer 3, whose transmittance after the light irradiation is not changed even after the termination of the light irradiation, that is, which have a temporary or permanent memory effect with respect to the transmittance after the termination of the light irradiation, include photochromic materials, for example, azo dyes such as 4-dimethylaminoazobenzene, thioindigos, o-hydroxybenzilideneaniline, o-nitrobenzyl, dithizone metals, spiropyran compounds, triphenylmethane dyes, halogenated silver, thionine-triethanolanine, and Viologen dyes, which may be dispersed alone or in combination, in glass or polymeric materials, if necessary, organic dyes such as cyanine dyes, merocyanine dyes, naphthoquinone dyes, squarylium dyes, phthalocyanine dyes, naphthalocyanine dyes, and azo dyes, which may be dispersed alone or in combination, in polymeric materials, if necessary, which are decolorized to become transparent when irradiated by a light with a low intensity for an extended period of time due to a photochemical reaction which takes place during the irradiation; and organic and inorganic phase-changing materials whose transmittances are increased by the light irradiation with high light intensity because of the thermal changes of the crystalline structures thereof during the irradiation.

Examples of the materials for the contrast-increasing layer 3 whose transmittance returns to that before the irradiation when the irradiation is terminated include organic dyes with a relatively long fluorescence life time and organic dyes with a large light absorbance, such as cyanine dyes, merocyanine dyes, triphenylmethane dyes, Rhodamine dyes, phthalocyanine dyes, naphthalocyanine dyes, p-oligophenylene, exazole, oxazole derivatives, stilbene derivatives, coumarinic derivatives, xanthene dyes, and oxazine dyes. These dyes can be employed alone or in combination, When necessary, these dyes are dispersed in a polymeric material when used.

These materials become transparent when exposed to a light with a high light intensity of about 1 $MWcm^{-2}$ because the light absorption of each of these materials is saturated by the exposure. In other words, these materials have saturable absorption properties.

Thermochromic materials whose light absorption changes by the heat generated when irradiated with a light with a high light intensity can also be employed as the materials for the above-mentioned contrast-increasing layer 3. Specific examples of such thermochromic materials are inorganic materials such as $Cu_2HgI_4$, and $Ag_2HgI_4$; spiropyrans; and combinations of cholesteric liquid crystals or leuco dyes, and higher alcohols or amides.

Examples of a light source for the irradiation employed in the present invention are a mercury vapor lamp serving as a light source with high light intensity, excimer laser, gas laser, semiconductor laser, and solid laser. In practical use, light beams or pulse light beams are obtained by condensing the light from these light sources.

The optical information recording medium according to the present invention and the recording method and reproduction method according to the present invention using the above optical information recording medium will now be explained.

In the present invention, there is utilized a layer whose transmittance or reflectance is increased in a real time manner in correspondence with the energy of an incident light to the layer. A condensed laser beam is used as the incident light, and an information mark can be recorded in the optical information recording layer of the recording medium or a recorded information mark can be reproduced therefrom, in a region which is substantially narrower than the spread region of the spot of the condensed laser beam. Therefore, in the present invention, optical information recording and reproduction can be carried out with an information recording density greater than the information recording density restricted by the size of the spot of the condensed laser beam.

Figure 3:
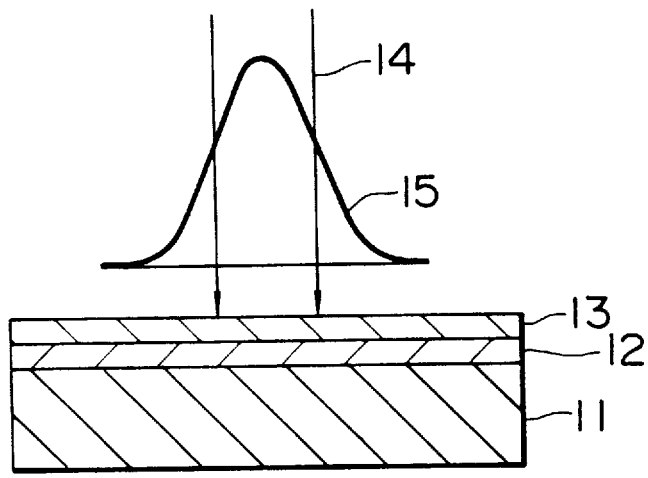
FIG. 3 is a schematic cross-sectional view of an example of an optical information recording medium according to the present invention.

FIG. 3 is a schematic cross-sectional view of an example of an optical information recording medium according to the present invention. An optical information recording layer 12 is provided on a substrate 11. An auxiliary layer 13 whose transmittance increases in a real tine manner corresponding to the energy of an incident light to the auxiliary layer 13 is provided in close vicinity to the optical information recording layer 12. A condensed laser beam 14 has an intensity distribution 15.

In the absence of the auxiliary layer 13, the size of a mark that can be recorded in the optical information recording layer 12 is limited by the spreading of the intensity distribution 15, so that when a recorded mark is reproduced, the mark cannot be reproduced accurately because of the mingling of the signals from adjacent marks or marks in adjacent tracks with the signals for the very mark to be reproduced due to the spreading of the intensity distribution 15. Thus the recording density is limited.

By contrast, in the present invention, because of the presence of the auxiliary layer 13, the transmittance of the auxiliary layer 13 is increased in the central portion of the intensity distribution 15 where the light energy density is large, so that the light energy in the central portion of the intensity distribution 15 can reach the optical information recording layer 12. However, the light energy in the peripheral portion of the spread of the intensity distribution 15, which is far less than the light energy in the central portion of the intensity distribution 15, can less reach the optical information recording layer 12. The result is that the irradiation to the optical information recording layer 12 is carried out with a spot diameter smaller than that of the condensed laser beam 14. Therefore, when information is recorded or recorded information is reproduced, the optical information recording layer 12 is irradiated with a laser beam with a spot diameter smaller than that of the condensed laser beam 14, whereby recording with a significantly high recording density can be carried out.

With reference to FIG. 3, it is preferable that the auxiliary layer 13 be provided on the substrate 11 and that the optical information recording layer 12 be overlaid on the auxiliary layer 13 when the substrate 11 is made of a transparent material and the laser beam is caused to enter the optical information recording layer 12 through the substrate 11.

Figure 4:
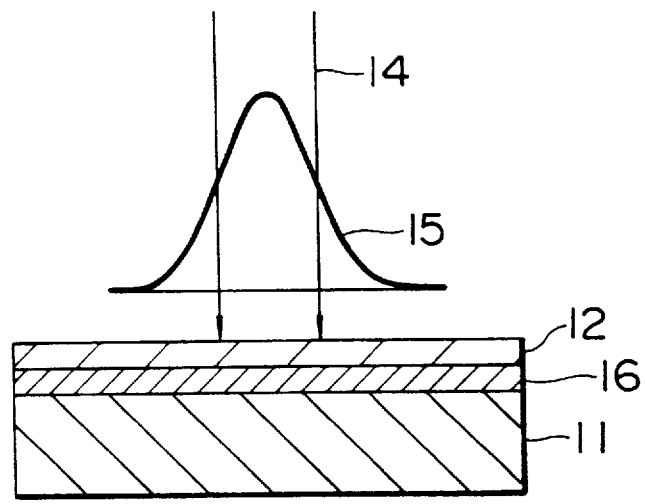
FIG. 4 is a schematic cross-sectional view of another example of an optical information recording medium according to the present invention.

FIG. 4 is a schematic cross-sectional view of another example of an optical information recording medium according to the present invention. An auxiliary layer 16 whose reflectivity increases in a real-time manner corresponding to the energy of an incident light thereto is provided on a substrate 11. An optical information recording layer 12 is provided in close vicinity to the auxiliary layer 15. In this case, it is necessary that the optical information recording layer 12 be translucent. When a condensed laser beam 14 passes through the optical information recording layer 12 and is reflected by the auxiliary layer 16, the intensity of the light reflected by a portion near the central portion of the condensed laser beam 14 with a large energy density is so large that the spreading of the laser beam reflected by the auxiliary layer 16 becomes substantially smaller than the spreading of the condensed laser beam 14. As a result, the resolution obtained at the time of reproducing recorded information is significantly improved.

In the case of the optical information recording medium shown in FIG. 4, it is preferable that the optical information recording layer 12 be provided on the substrate 11 and that the auxiliary layer 16 be overlaid on the optical information recording layer 12 when the substrate 11 is a transparent substrate and the laser beam 14 is caused to enter the optical information recording layer 12 through the transparent substrate.

Figure 5:
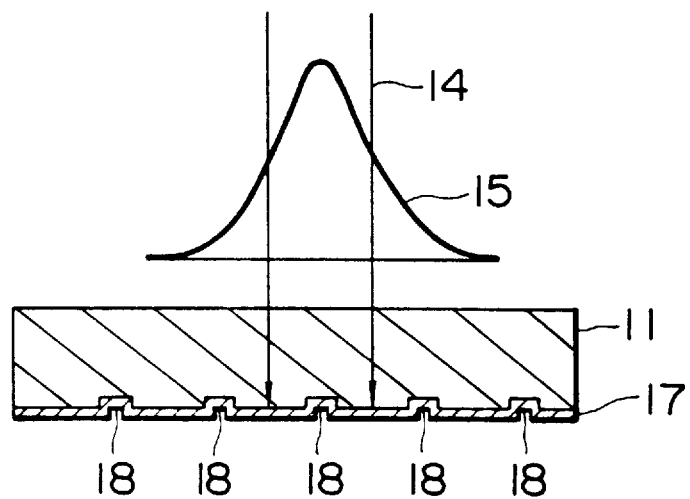
FIG. 5 is a schematic cross-sectional view of a further example of an optical information recording medium according to the present invention.

FIG. 5 is a schematic cross-sectional view of a further example of an optical information recording medium according to the present invention. In the figure, reference numeral 11 indicates a transparent substrate in which information is recorded in the form of concave or convex pits 18. On the transparent substrate 11, there is provided an auxiliary layer 17 whose transmittance or reflectivity increases in correspondence to the energy of an incident light thereto. In this structure, even when the condensed laser beam 14 has an intensity distribution 15 with a spreading as shown in FIG. 5, only the information near the central portion of the condensed laser beam 14 is mainly detected as reflected light or transmitted light. Therefore, the pits 18 are irradiated with a light spot with a spreading substantially narrower than the spreading of the condensed laser beam 41. As a result, the mixing of signals from adjacent pits or tracks with the signals from the pits to be detected is significantly reduced, so that the recording density can be increased to 1.5 to 6 times the recording density obtained by conventional methods.

As the materials for the substrate 11 of the optical information recording medium according to the present invention, conventionally employed materials such as glass, polymethyl methacrylate, polycarbonate, polyolefin resin, and epoxy resin can be employed.

As the materials for the optical information recording layer 12 of the optical information recording medium according to the present invention, light-absorbing or light-reflecting inorganic materials such as metals, alloys, and metal compounds, organic dyes, magneto-optical recording materials, and phase-transition recording materials can be employed. It is preferable that the optical information recording layer 12 have a thickness of 5 nm to 500 nm, more preferably a thickness of 10 nm to 150 nm.

As the materials for the auxiliary layer 13 or 16 whose transmittance or reflectivity increases in a real time manner in correspondence with the energy of an incident light thereto, any materials whose transmittance or reflectance is changed by the photochemical or exothermic effects produced by the irradiation with a light having high energy density such as a condensed laser beam can be employed. Such an auxiliary layer can be fabricated by combining a layer with a changeable transmittance and a reflective layer made of, for instance, a metal, to change the reflectance thereof. It is preferable that such an auxiliary layer have a thickness of 5 nm to 500 nm, more preferably a thickness of 10 nm to 150 nm.

Examples of the material for the auxiliary layer are thermochromic materials, photochromic materials, and phase-transition materials.

Specific examples of the thermochromic materials are inorganic materials such as $Cu_2HgI_4$, and $Ag_2HgI_4$; spiropyrans, and combinations of cholesteric liquid crystals or leuco dyes, and higher alcohols or amides.

Specific examples of the photochromic materials are azo dyes such as 4-dimethylaminoazobenzene; thioindigos; o-hydroxybenzilideneaniline; o-nitrobenzyl; dithizone metals; spiropyrans; triphenylmethane dyes; silver halide; thionine-triethanolamine; and Viologene dyes. These can be used alone or in combination, or when necessary, by dispersing the same in a polymeric material. Organic dyes, pigments, and inorganic dyes can also be employed since they can be made transparent when irradiated with a light with high energy density. More specifically, cyanine dyes, merocyanine dyes, naphthoquinone dyes, squarylium dyes, phthalocyanine dyes, naphthalocyanine dyes, and azo dyes can be employed.

Figure 6:
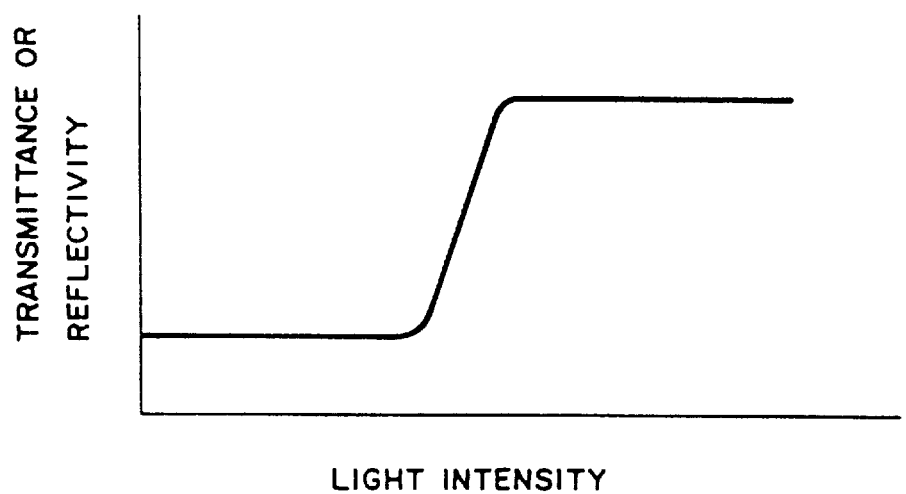
FIG. 6 is a graph showing the relationship between the light intensity and the transmittance or reflectivity of a layer whose transmittance or reflectance changes in a real time manner.

It is preferable that the auxiliary layer 13 or 16 whose transmittance or reflectivity increases in a real tine manner correspondingly to the energy of an incident light thereto have a large threshold value with respect to the changes in the reflectivity or transmittance as illustrated in FIG. 6. Therefore, organic and inorganic materials whose phases change between a liquid state and a solid state, or between a crystalline state and a non-crystalline state can be employed as the materials for the auxiliary layer 13 or 16.

Thus, when information is recorded in the optical information recording medium with a structure as mentioned above or recorded information is reproduced therefrom by radiating the recording medium with a minute laser beam spot having a predetermined power, an optical mark can be formed within a region substantially narrower than the spread region of the minute laser beam. Furthermore, by the optical information recording medium in which the optical mark has been thus recorded being radiated with a laser beam spot with a power smaller than that of the laser beam spot employed at the time of recording, a reflected light or transmitted light with a spreading substantially narrower than the spreading of the minute laser beam spot can be detected, so that recording information and reproducing recorded information can be carried out with higher resolution than that attained by the conventional methods.

The features of this invention will become apparent in the course of the following description of exemplary embodiments, which are given for illustration of the invention and are not intended to be limiting thereof.

EXAMPLE 1

A recording layer consisting of SeTe with a thickness of 30 nm was formed on a glass substrate with a thickness of 1.2 mm.

A contrast-increasing layer consisting of a cyanine dye with the following formula with a thickness of 50 nm was formed on the above recording layer by spin coating, whereby an optical information recording medium according to the present invention, with a layer structure as shown in FIG. 1 was fabricated.

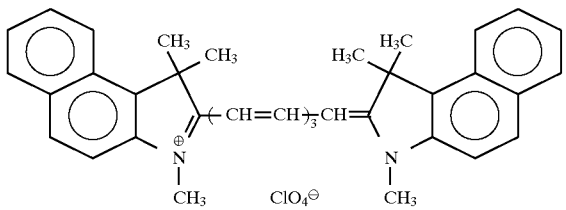

A semiconductor laser beam with a wavelength of 780 nm and a beam spot diameter of 1 μm (in terms of full width at half maximum) was applied to the contrast-increasing layer in such a manner as to be condensed onto the contrast-increasing layer, with a light power of 2 mW and a pulse width of 250 nsec.

The beam spot diameter of the laser beam on the beam-transmitted side of the contrast-increasing layer measured 0.7 μm in terms of full width at half maximum, which was narrower than the beam spot diameter of the incident semiconductor laser beam.

EXAMPLE 2

The procedure for Example 1 was repeated except that a semiconductor laser beam with a light power of 0.1 mW was continuously applied to the contrast-increasing layer until the transmittance thereof became 50%.

The beam spot diameter in terms of full width at half maximum on the beam-transmitted side of the contrast-increasing layer was 0.75 μm, which was narrower than the beam spot diameter of the incident semiconductor laser beam.

EXAMPLE 3

The procedure for Example 1 was repeated except that a semiconductor laser beam with a light power of 4 mW and a pulse width of 500 nsec was applied to the contrast-increasing layer to form small pits therein.

The beam spot diameter in terms of full width at half maximum on the beam-transmitted side of the contrast-increasing layer was 0.7 μm, which was narrower than the beam spot diameter of the incident semiconductor laser beam.

EXAMPLE 4

Concave and convex pits were formed with intervals of 0.5 μm on a 1.2 mm polycarbonate substrate.

The same cyanine dye as employed in Example 1 was coated with a thickness of 35 nm on the above prepared substrate. Furthermore, an aluminum film with a thickness of 60 nm was provided on the cyanine dye layer, whereby an optical information recording medium according to the present invention was fabricated.

Information reproduction was conducted by a laser beam with a beam spot diameter of 1 μm (in terms of full width at half maximum), a reproduction power of 1.5 mW, a wavelength of 780 nm, and a linear speed of 5.6 m/sec. As a result, the obtained C/N ratio was 50 dB.

COMPARATIVE EXAMPLE 1

The procedure for Example 4 was repeated except that the cyanine dye layer was not provided. The C/N ratio obtained under the same information reproduction conditions as in Example 4 was 43 dB.

EXAMPLE 5

Concave and convex pits were formed with intervals of 0.5 μm on a 1.2 mm polycarbonate substrate.

The same cyanine dye as employed in Example 1 was coated with a thickness of 35 nm on the above prepared substrate. Furthermore, a GeTeSb-based phase transition recording layer with a thickness of 60 nm was provided on the cyanine dye layer, whereby an optical information recording medium according to the present invention was fabricated.

A laser beam with a recording power of 5 mW was applied with intervals of 0.5 μm to the pit-free portions of the above optical information recording medium where no pits were formed.

Information reproduction was conducted under the same conditions as in Example 4. The thus obtained C/N ratio was 48 dB.

COMPARATIVE EXAMPLE 2

The procedure for Example 5 was repeated except that the cyanine dye layer was not provided. The C/N ratio obtained under the same information reproduction conditions as in Example 5 was 41 dB.

According to the light irradiation method of the present invention, an object can be exposed to a light spot or light pattern with a higher resolution, a higher definition and a higher contrast than those of the light spot or light pattern employed for irradiation, whereby information recording and reproduction with high density and fine printing can be carried out.

Furthermore, the optical information recording medium according to the present invention, and the recording and reproduction method according to the present invention, using the above optical information recording medium can carry out information recording and reproduction with higher density than that obtained by the conventional optical information recording media and recording and reproduction methods.

What is claimed is:

1. An irradiation method of applying a light spot or a light pattern to an object with high resolution, comprising the steps of:

disposing, in close vicinity to said object, a light-absorbing contrast-increasing layer whose transmittance or reflectivity with respect to an incident light thereto increases as the intensity of said incident light or the exposure thereof to said incident light increases; and applying light to said object through said light-absorbing contrast-increasing layer, the light applied being a laser beam with an intensity of about 1 $MWcm^{-2}$, wherein the transmittance of said light-absorbing contrast-increasing layer, after the application of light thereto, returns to the transmittance thereof before the application of light thereto, when said step of applying light is terminated, and wherein the light-absorbing contrast-increasing layer comprises a cyanine dye which becomes transparent when irradiated, with the light absorption thereof being saturated.

2. An optical information recording method comprising the step of applying a minute light beam spot to an optical information recording medium comprising a substrate, an optical information recording layer and an auxiliary layer whose transmittance or reflectance increases in a real time manner correspondingly to the energy of an incident light thereto, to form a corresponding optical mark in a region substantially narrower than the spreading of said minute light beam spot, wherein the transmittance of said auxiliary layer, after the application of light thereto, returns to the transmittance thereof before the application of light thereto, when said step of applying light is terminated, and wherein the light-absorbing contrast-increasing layer comprises a cyanine dye which becomes transparent when irradiated, with the light absorption thereof being saturated.

* * * * *